United States Patent [19]
Foley et al.

[11] Patent Number: 5,927,654
[45] Date of Patent: Jul. 27, 1999

[54] SPACECRAFT WITH ACTIVE ANTENNA ARRAY PROTECTED AGAINST TEMPERATURE EXTREMES

[75] Inventors: James Paul Foley, Fremont, Calif.; Bronson Murray, Freehold, N.J.

[73] Assignee: Lockheed Martin Corp., Sunnyvale, Calif.

[21] Appl. No.: 08/856,420

[22] Filed: May 16, 1997

[51] Int. Cl.⁶ .................................................. B64G 1/44
[52] U.S. Cl. ............................................................ 244/173
[58] Field of Search .................................... 244/173, 168; 136/292, 245; 343/878, 70 S, DIG. 2

[56] References Cited

U.S. PATENT DOCUMENTS

| | | | |
|---|---|---|---|
| 3,559,919 | 2/1971 | Sass | 244/173 |
| 4,133,502 | 1/1979 | Anchutin | 244/173 |
| 4,988,060 | 1/1991 | Janson et al. | 244/173 |
| 5,666,128 | 9/1997 | Murray et al. | 244/173 |
| 5,742,254 | 4/1998 | Bassaler | 244/173 |
| 5,785,280 | 7/1998 | Baghdasarian | 244/173 |

OTHER PUBLICATIONS

Briggs et al, "electrical power subsystem for Insat–I", Procddd. of the 15th inersociety energy conversion engr. conf. seattle wash, Aug. 22, 1980.

*Primary Examiner*—Galen L. Barefoot
*Attorney, Agent, or Firm*—W. H. Meise; R. P. Kennedy

[57] ABSTRACT

A spacecraft carries a deployable active antenna array panel(s) and a deployable solar array panel(s). In the stowed condition, the antenna array panel(s) is sandwiched between a side of the body of the spacecraft and the solar array panel(s). This stowed state prevents the antenna panels from becoming too cold by radiation, or too hot by insolation, in an intermediate orbit. The outermost solar panel preferably has its active surface facing outward, so that it can generate electricity in the intermediate orbit.

11 Claims, 6 Drawing Sheets

SPACECRAFT WITH ACTIVE ANTENNA ARRAY PROTECTED AGAINST TEMPERATURE EXTREMES

FIELD OF THE INVENTION

This invention relates to spacecraft which carry deployable active antenna arrays, and more particularly to communication spacecraft intended for extended operating durations.

BACKGROUND OF THE INVENTION

Communications spacecraft are widely used to provide wide-bandwidth communications. Such spacecraft are extremely expensive, and as a consequence it is economically imperative to derive the maximum possible operating life. Communication spacecraft must maintain their antennas directed toward the regions which they serve. The environment in space is such that forces act on the spacecraft which tend to change its attitude, which in turn tends to direct the communications antenna away from the desired region. Attitude errors are corrected by attitude control systems, which use various techniques for generating the attitude-control moments. Magnetic torquers can be used, but tend to have a limited range of torque. Reaction or momentum wheels can be used to provide torque, and rockets or thrusters arranged to provide moments may also be used. When reaction or momentum wheels are used, secular increases in wheel speed can ultimately lead to destruction of the wheel due to centrifugal forces; the wheel speed is therefore periodically reduced by use of thrusters. Thus, attitude control of spacecraft, for the most part, requires the use of thrusters of some sort, such as chemical bipropellant or monopropellant, arcjets, or the like. Such thrusters require propellant. In some orbits, propellant must also be used to maintain the spacecraft at the proper station. The end of the useful life of a spacecraft, then, in the absence of a malfunction, occurs when the supply of propellant is exhausted. Every effort is therefore made during the design and construction of the spacecraft to minimize the weight of the structure and payload, so that more propellant can be carried into orbit.

As mentioned above, a communication spacecraft ordinarily carries at least one antenna, by which communication is established with appropriate terminals on the Earth. In the past, reflector antennas have been used, with one or more horns located at a feed point of the reflector. Because of the difficulties of achieving the desired beam shape with a reflector-type antenna, and of reconfiguring the beamshape as conditions require, attention has been directed to array antennas, which can be remotely reconfigured by adjustment of phase shifters and/or level controls associated with each antenna element of the array. Reliability and considerations of the weight of beamforming networks has pushed the art toward the use of active array antennas, in which each antenna element of the antenna array is associated with at least an active element in the form of an amplifier, either for transmission or for reception, or both. The art of array antennas, and of active array antennas, is well advanced.

The use of active array antennas on spacecraft is not without its problems. At the current state of the art, the individual amplifiers which are associated with each antenna element for transmission tend, taken as a whole, to be less efficient than the prior-art amplifiers used in central-feed-with-beamformer antennas, so more electrical energy is required to operate an active array antenna than a central-feed array. The heat generated by the active elements of an active array antenna must somehow be removed from the antenna. In the case of active array antennas in the form of one or more thin panels, heat removal may often be accomplished by arranging the side of panel, opposite to the side with the antenna array, as a heat radiator, which allows heat to be rejected to space. Another problem is that of providing the increased electrical energy required to provide a given level of transmitted power. The power problem can be solved only by providing a suitable power source. Nuclear power sources cannot be justified, so a sufficiently large or efficient solar array must be provided for converting sunlight into electrical energy. The electrical energy can be used for spacecraft housekeeping as well as for energizing the communications payload.

Another problem with active array antennas is their size. The antenna gain is related to the surface area of the antenna, and achieving the high gain needed for the desired beam contour control requires a large active surface. At the time of launch of the spacecraft, the array antenna and the solar panels must be fitted, together with the main body of the spacecraft, into the shroud of a booster rocket. This constraint requires that the array antenna and the solar array be arranged in the form of stowable panels, which are folded or otherwise collapsed against the body of the spacecraft to make a structure which is small enough to fit into the shroud. This requirement, in turn, leads to a requirement for a mechanism to deploy the solar panels to form the solar array, and to deploy the active array antenna. This problem is exacerbated by the large forces acting on the stowed panels during launch of the booster vehicle. While it is easy in concept to provide a strong deployment mechanism, it is difficult to do so within the weight and reliability constraints of a spacecraft.

Ordinarily, spacecraft are not launched to their final orbits in a single maneuver. Instead, the booster vehicle boosts the spacecraft to an intermediate or transfer orbit. After some time, the intermediate orbit may be adjusted by the use of on-board thrusters, and then a further velocity change maneuver is performed to boost the spacecraft to the final orbit. The stowed antenna and solar array panels remain in the stowed positions until the spacecraft is in the final orbit, to prevent damage due to the forces attributable to the velocity change maneuver. While in the intermediate orbit, the spacecraft is not fully operational, but is subject to many of the same environmental conditions as those in its final orbit.

During normal operation of the antenna array, the antenna array panels are deployed, and the active elements associated therewith are energized. As mentioned above, the waste heat resulting from the operation of the active elements of the active antenna array tends to heat the antenna panels. The heat-rejecting side of the antenna panels face empty space, and radiate heat to tend to maintain the temperature of the active elements of the active antenna array within design temperature limits selected for reliable long life. Such a temperature range might be, for example, −60° C. to +120° C. During the transfer orbit, however, the active elements of the antenna array are not energized. The heat-rejecting side of each panel, if exposed to space, would continue to reject heat, and might possibly result in a panel temperature less than the design minimum.

Also during normal operation of the solar array, the array panels are deployed, and a mechanism orients the active side of the solar panels toward the sun, so that maximum electrical power is always available, except when the spacecraft is in eclipse. During the intermediate orbit, however, the solar array panels are not deployed, and little electrical power may be available. Some electrical energy may be required to heat the antenna array panels, to offset radiation from the panels, to prevent their temperatures from dropping too low. If the batteries of the spacecraft are used to provide electrical energy for heating the active antenna array, the duration of the intermediate orbit cannot exceed the length of time which the battery charge can sustain, which places undesirable constrains on operation of the spacecraft. As an alternative or supplement to the use of heaters, the active antenna array panels may be insulated to prevent radiation to space, and thereby substantially reduce the electrical heater power required. However, the insulation has undesired mass, and may tend to interfere with the deployment of the active antenna array panels.

Improved spacecraft arrangements are desired.

SUMMARY OF THE INVENTION

A spacecraft according to the invention comprises a supporting body. The payload of the spacecraft includes an active antenna array. The active array antenna includes at least one active antenna array panel. Active electronics elements, such as amplifiers, are inherently associated with an active array antenna, and the active elements generate heat when energized. The active antenna array panel has (or defines) an antenna side, which has the principal purpose of radiating electromagnetic energy or signals and also defines a second side having the principal function of heat rejection. The heat-rejecting second side is for radiating heat due to operation of the active elements, to aid in maintaining the temperature of the active elements. The active antenna array panel is stowed with one of its first (antenna) side and second (heat-rejecting) side in proximity to, or near, the spacecraft body, and with the other one of the first and second sides facing away from the spacecraft body. Thus, one of the heat-rejecting or the antenna sides of an active antenna array panel faces the body of the spacecraft in the stowed condition. While the active antenna array would not ordinarily be energized during those times in which the active array antenna panel in the stowed state, if it were to be so energized with the antenna side facing the body, electromagnetically reflective and absorptive portions of the body would tend to prevent useful electromagnetic radiation, and if the heat-rejecting side of the antenna array panel were facing the body, the body would tend to absorb heat and to radiate heat back to the heat-rejecting side of the antenna array panel, thus effectively negating the heat rejection. In a deployed state, the antenna array panel is affixed to the body, as by a hinge or other support which allows deployment, in a position in which the electromagnetic energy radiating first side and the heat radiating second side of the antenna panel radiate substantially unimpeded by the spacecraft body. Ordinarily, the first or antenna side of the active antenna array panel faces the Earth's surface for communication therewith, and the heat-rejecting side faces "empty" space for tending to reject waste heat and thereby aid in maintaining the temperature of the antenna array. The spacecraft includes a solar array with at least one solar panel. The solar panel defines an active side which is responsive to solar radiation for producing electrical energy, and the electrical energy is used for energizing at least the deployed antenna array, and may be used for other purposes. The solar panel, in a deployed state, is located relative to the active antenna array panel in such a manner as not to substantially impede the radiation of heat and electromagnetic energy therefrom. The solar panel is stowed adjacent to that one of the first (antenna) and second (heat-rejecting) sides of the antenna array panel which is remote from, or more distant from, the spacecraft body. Thus, the solar panel is located "outside" the antenna panel in the stowed state, with the antenna panel "sandwiched" between the spacecraft body and the solar panel(s). With this stowed state, the solar panel(s) insulate the antenna array against temperature changes attributable to heating due to exposure to solar radiation and cooling due to heat radiation from the antenna array to space.

In a preferred embodiment of the invention, the active side of the outermost one of the solar panel(s), in the stowed condition, is remote from the antenna array panel and exposed to space. With the described stowed condition of the outermost solar panel, it can produce electrical energy when exposed to solar radiation, even in an intermediate orbit.

A method according to the invention stows the active antenna array panel(s) against the body, and stows the solar panel(s) over the antenna panels, preferably with the active side of the outermost solar panel exposed so that it can receive solar radiation. The spacecraft is then mounted on a booster, which launches the spacecraft into an intermediate orbit. In the intermediate orbit, the exposed solar panel may be operated in order to produce energy for operating the spacecraft. From the intermediate orbit, the spacecraft is transferred to a desired orbit. In the desired orbit, the solar panel(s) are deployed, and the active antenna array panel(s) are deployed.

In one embodiment of the invention, a thruster is mounted on the body, and at least one propellant tank is mounted on the body, and coupled to the thruster for controllably providing propellant thereto. The propellant tank is filled with propellant to the desired launch weight.

DESCRIPTION OF THE INVENTION

Figure 1:
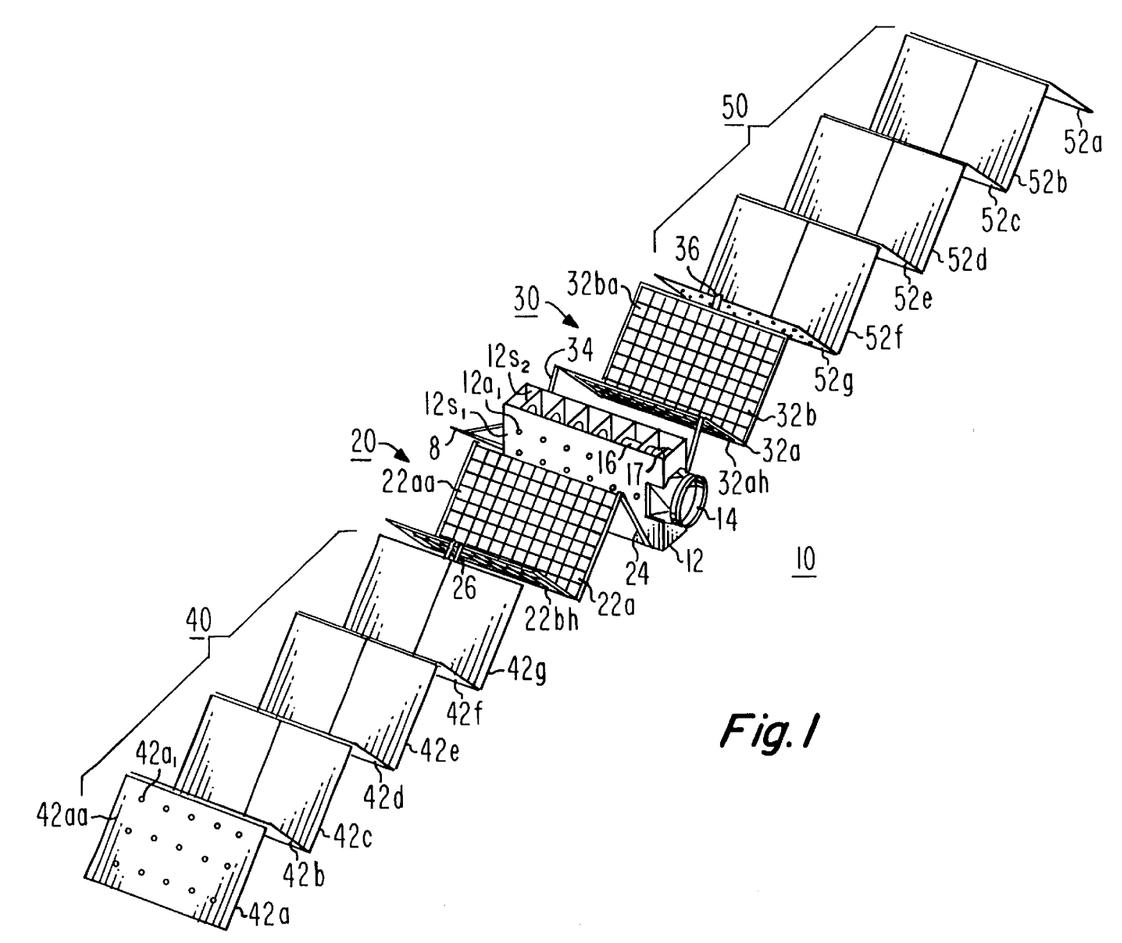
FIG. 1 is a simplified perspective or isometric view of a spacecraft according to an aspect of the invention, with a partially deployed active antenna array supported by the spacecraft body, and a partially deployed solar panel array deployed from the outermost one of the antenna array panels.

In FIG. 1, a spacecraft or satellite 10 includes a body 12 having a rocket engine or thruster 14 affixed at one end thereto, and has an omnidirectional antenna 8 affixed at another end. Body 12 has a first side $12s_1$ and a second side $12s_2$ held together by a plurality of intercostal walls, not separately designated. A first active array antenna designated as 20, and including active array antenna panels 22a and 22b, is illustrated as being partially deployed from the body 12 of spacecraft 10. More particularly, active array antenna panel 22a is illustrated as being supported by a pair of support elements 24, only one of which is visible. Support elements 24 are hinged to body 12 to allow deployment of the panels away from the spacecraft body. Active antenna array panel 22a is hinged to the pair of support elements, to allow deployment of panel 22a away from the support elements 24, and active antenna array panel 22b is hinged to active antenna array panel 22a, to allow further deployment, all as known in the art.

Active antenna array 22a of FIG. 1 has an antenna side 22aa facing the viewer. Active antenna array 22b has a reverse side 22bh visible to the viewer. The antenna side 22aa of active antenna array panel 22a is the side which radiates electromagnetic signals or energy in one or more antenna beams. Side 22aa is also capable of radiating heat energy under appropriate conditions, which include geosynchronous orbit conditions. The radiation of heat from the antenna side of an array is described inter alia in U.S. Pat. No. 5,608,414, issued Mar. 4, 1997 in the name of Amore. The reverse side of active antenna array panel 22a (not visible in FIG. 1) is principally intended to radiate heat energy from the panel, in order to aid in maintaining the temperature of the panel within limits appropriate to the specifications of the active elements of the panel. The reverse side 22bh of active antenna array panel 22b is principally a heat rejection surface, and panel 22b also has an antenna side (not visible in FIG. 1) which is adapted for electromagnetic signal radiation. A modular panel in which the electromagnetic signal energy is radiated from one face, and in which the reverse side is thermally coupled to at least some of the active elements in order to improve heat removal, is described in allowable U.S. patent application Ser. No. 08/622,724, filed Mar. 26, 1996 in the name of Cherrette et al.

According to an aspect of the invention, the spacecraft 10 of FIG. 1 also includes a solar array 40 comprising a plurality of solar array panels 42a, 42b, 42c, 42d, 42e, 42f, and 42g, which are hinged to each other and to the outermost of the active array antenna panel to allow their deployment. The use of hinges between deployable panels is well known, and a particularly advantageous type of hinge is described in U.S. Pat. No. 5,239,793, issued Aug. 31, 1993 in the name of Chiappetta et al. Active antenna array panels are also well known, and the Chiappetta et al. patent also describes the structure of one type of active antenna array panels including active modules.

Figure 2:
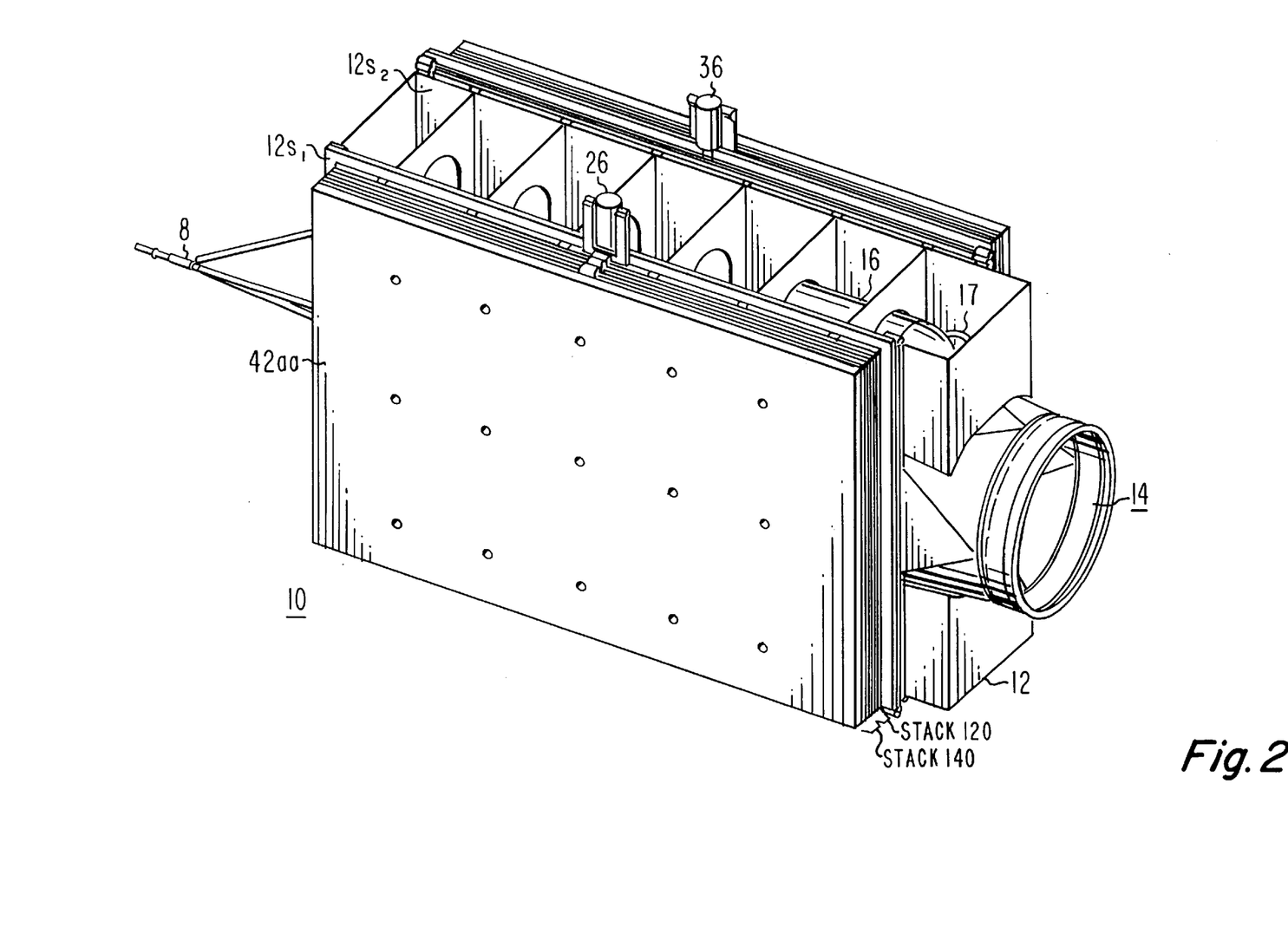
FIG. 2 is a perspective view of the spacecraft body of FIG. 1 with the antenna and solar array panels in their stowed positions.

In the arrangement of FIG. 1, the solar panels 42a, 42b, 42c, 42d, 42e, 42f, and 42g are hinged together to form a structure which can be stowed in the form of a stack of solar panels, and the active antenna array panels are similarly hinged together so that they can be stowed in the form of a stack of active antenna array panels, as illustrated in FIG. 2. The assemblage of hinged-together solar panels 42a, 42b, 42c, 42d, 42e, 42f, and 42g of FIG. 1 is supported by or affixed to the body 12 of the spacecraft 10 by the intermediary support of the active antenna array 20 panels 22a and 22b, the support members 24, and a mechanically articulable or rotatable joint 26, which is arranged to allow the panels 42a, 42b, 42c, 42d, 42e, 42f, and 42g of the solar array 40, in their deployed state, to face in a different direction than the panels 22a, 22b of the active array antenna 20. Joint 26 is motorized and remotely operated, so that the solar panels may be moved relative to the body of the spacecraft to track the sun, all in known manner.

Side $12s_1$ of spacecraft body 12 of FIG. 1 is illustrated as having an array of a plurality of openings or apertures, one of which is designated $12a_1$. Aperture or opening $12a_1$ is representative of the apertures through which retaining cords or cables can pass, to aid in holding or retaining the stack of antenna panels 22a, 22b and the overlying stack of solar panels 42a, 42b, 42c, 42d, 42e, 42f, and 42g in their stowed state. For this purpose, each of the panels has an array of apertures registered with the apertures $12a_1$ in the side $12s_1$ of body 12 of spacecraft 10. The array of apertures in each of the panels is represented by an array of apertures in panel 42a, one of which is designated $42a_1$. It is easy to understand that, with the antenna and solar panels collapsed into a stack, with each panel pierced by registered apertures, that retaining cords can pass from outside to inside through the stack, and retain the panels of the stack against launch forces.

In addition to active antenna array 20 with its panels 22a and 22b, supporting a multipanel solar array 40, the spacecraft 10 of FIG. 1 also bears a second active antenna array 30 including antenna panels 32a and 32b, which supports, by way of a rotary or articulated joint 36, a further multipanel solar array 50. Multipanel solar array 50 includes solar panels 52a, 52b, 52c, 52d, 52e, 52f, and 52g, all hinged together in a manner similar to that of multipanel solar array 40. In FIG. 1, the antenna side 32ba of active antenna array panel 32b is visible, and the reverse or non-antenna side 32ah of active antenna array panel 32a can be seen.

It should be noted that the spacecraft body 12 of FIG. 1 appears smaller than some prior-art spacecraft bodies relative to the dimensions of the solar panels. This is because, with a large proportion of the payload of active elements being mounted in or on the active antenna array panels, the body needs to carry only some housekeeping controllers, propellant tanks and thrusters, including attitude control thrusters (not illustrated).

FIG. 2 is a view of the spacecraft of FIG. 1 with the array 40 of solar panels 42 folded against each other to form a stack 140 in the stowed state, and with the stack 140 of stowed solar array panels overlying a stack 120 of active antenna array panels 22, so that the stack 120 of active antenna array panels 22 is sandwiched between the innermost solar panel of the stack 140 of solar array panels and the surface $12s_1$ of the spacecraft body 12.

Figure 3:
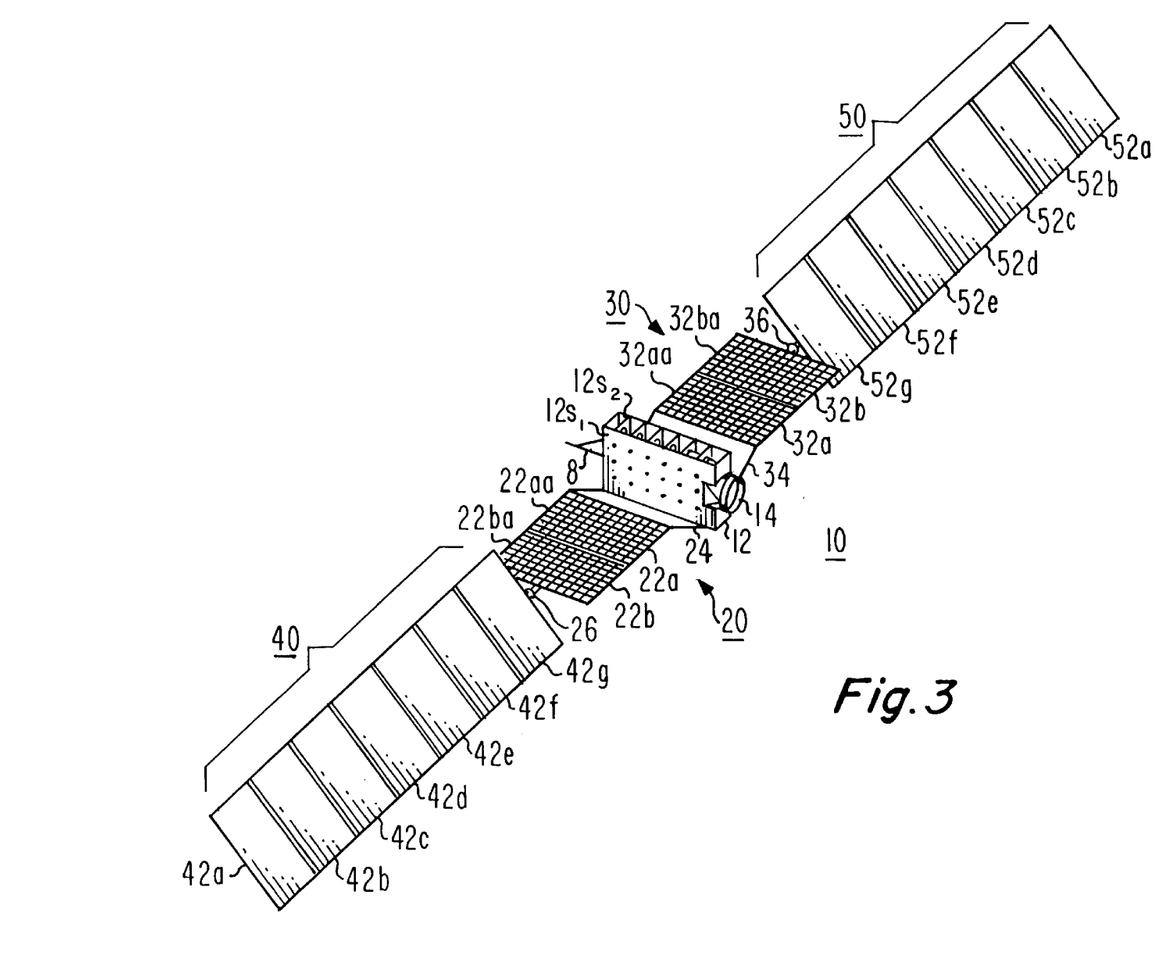
FIG. 3 is a simplified perspective or isometric view of the spacecraft of FIG. 1 with fully deployed active antenna array supported by the spacecraft body, and a fully deployed solar panel array deployed from the outermost one of the antenna array panels.

FIG. 3 is similar to FIG. 1, but illustrates the antenna arrays 20, 30 and the solar panel arrays 40, 50 in their fully deployed states, with the joints 26, 36 rotated so that the nominal planes of the antenna arrays and the solar arrays differ.

Figure 4:
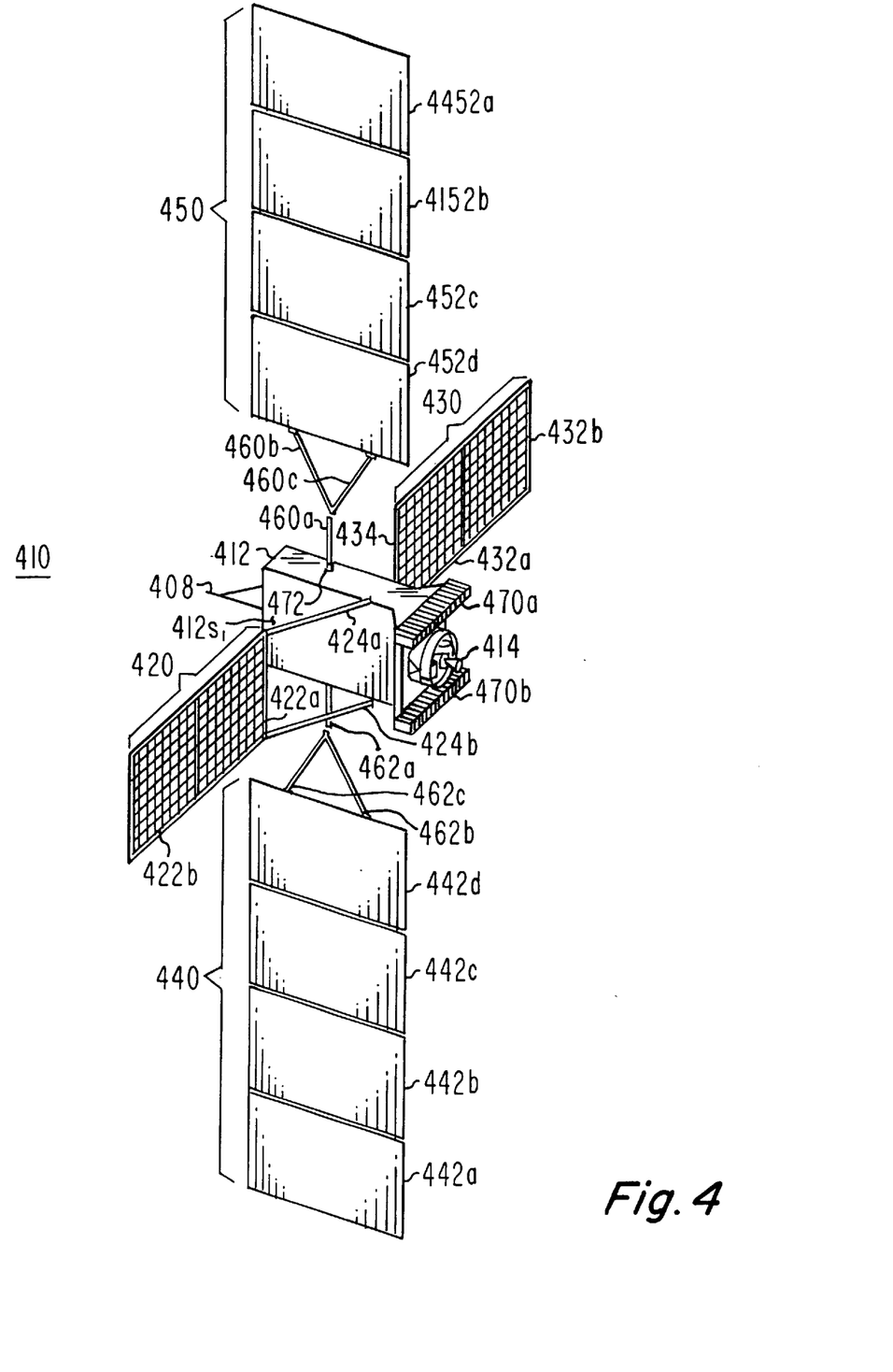
FIG. 4 is a simplified perspective or isometric view of a spacecraft according to another aspect of the invention with active antenna arrays and solar arrays in a deployed state.

FIG. 4 illustrates another spacecraft according to the invention. Elements of FIG. 4 corresponding to those of FIGS. 1, 2, and 3 are designated by corresponding reference numerals in the 400 series. Spacecraft 410 is illustrated first in the deployed state of FIG. 4 for convenience of identifying the various parts, which are difficult to distinguish in the stowed state. Spacecraft 410 of FIG. 4 has a body 412 and a velocity change thruster illustrated as 414. Body 412 also carries batteries in arrays 470a and 470b. A first active antenna array 420 includes panels 422a and 422b, which are hinged to each other. Innermost panel 422a is held to body 412 by a pair of supports 424a and 424b, which are hinged so that panels 422a and 422b, when folded into a stack, can be laid flat against side $412s_1$ of spacecraft body 412. Similarly, a second active antenna array 430 includes panels 432a and 432b, which are hinged to each other. Innermost panel 432a is held to body 412 by a pair of supports 434, only one of which is visible, which are hinged so that panels 432a and 432b, when folded into a stack, can be laid flat against that side of spacecraft body 412 opposite to side $412s_2$.

Solar panel 440 of FIG. 4 includes solar panels 442a, 442b, 442c, and 442d, attached to each other in a hinged fashion, with innermost panel 442d affixed to the body 412 of spacecraft 410 by a foldable support structure illustrated as including support members 462a, 462b, and 462c. Similarly, solar panel 450 of FIG. 4 includes solar panels 452a, 452b, 452c, and 452d, attached to each other in a hinged fashion, with innermost panel 452d affixed to the body 412 of spacecraft 410 by a foldable support structure illustrated as including support members 460a, 460b, and 460c. Support member 460a is connected by way of a rotational or otherwise articulable joint 472, which allows the deployed solar array to be rotated relative to the spacecraft body 412.

Figure 5:
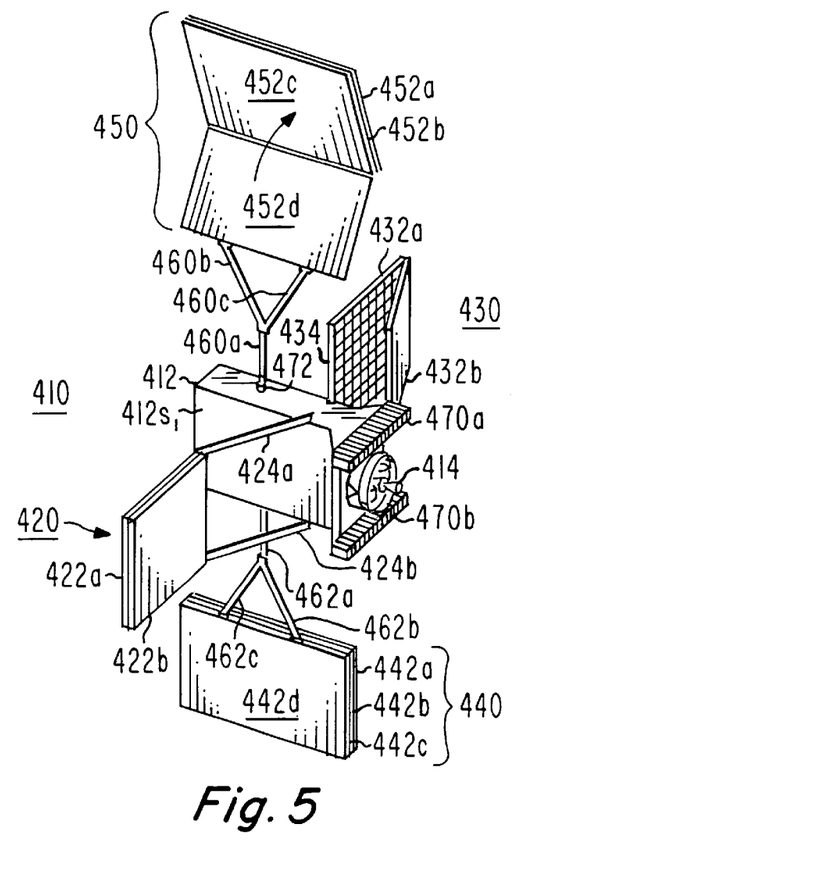
FIGS. 5 and 6 are illustrations of the spacecraft of FIG. 4 with their arrays partially deployed.

FIG. 5 illustrates the spacecraft 410 of FIG. 4 in a partially deployed state. As illustrated in FIG. 5, the antenna panels 422a and 422b of array 420 are still folded together, with their active sides facing each other, but the stack of panels 422a and 422b is deployed away from side $412s_1$. Antenna panels 432a and 432b are somewhat separated, so that the active array elements can be seen as a gridwork on panel 432a. The partially deployed "stack" of panels 432a and 432b is also deployed away from body 412 of spacecraft 410 by a pair of support elements, one of which is visible and designated 434. As illustrated in FIG. 5, solar array support members 462a, 462b, and 462c are deployed, and the stack of solar panels 442a, 442b, 442c, and 442d are ready for unfolding to expose the separate panels. Similarly, solar array support members 460a, 460b, and 460c are deployed, and the stack of solar panels 452a, 452b, 452c, and 452d has begun to deploy. More particularly, panel 452d is already exposed, and panels 452c, 452a, and 452b are ready for unfolding from each other to expose the separate panels. It should be understood that the described deployment sequence of the various panels is only for explanation, and is not part of the invention. The only deployment requirement is that the solar panels deploy first, so as to allow the antenna panels to be deployed away from the spacecraft body.

Figure 6:
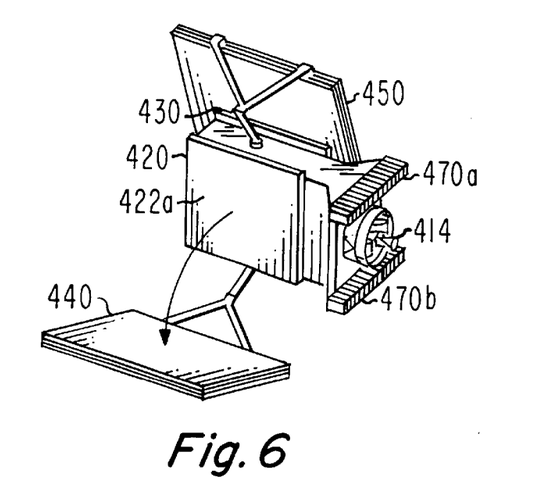
Figure 7:
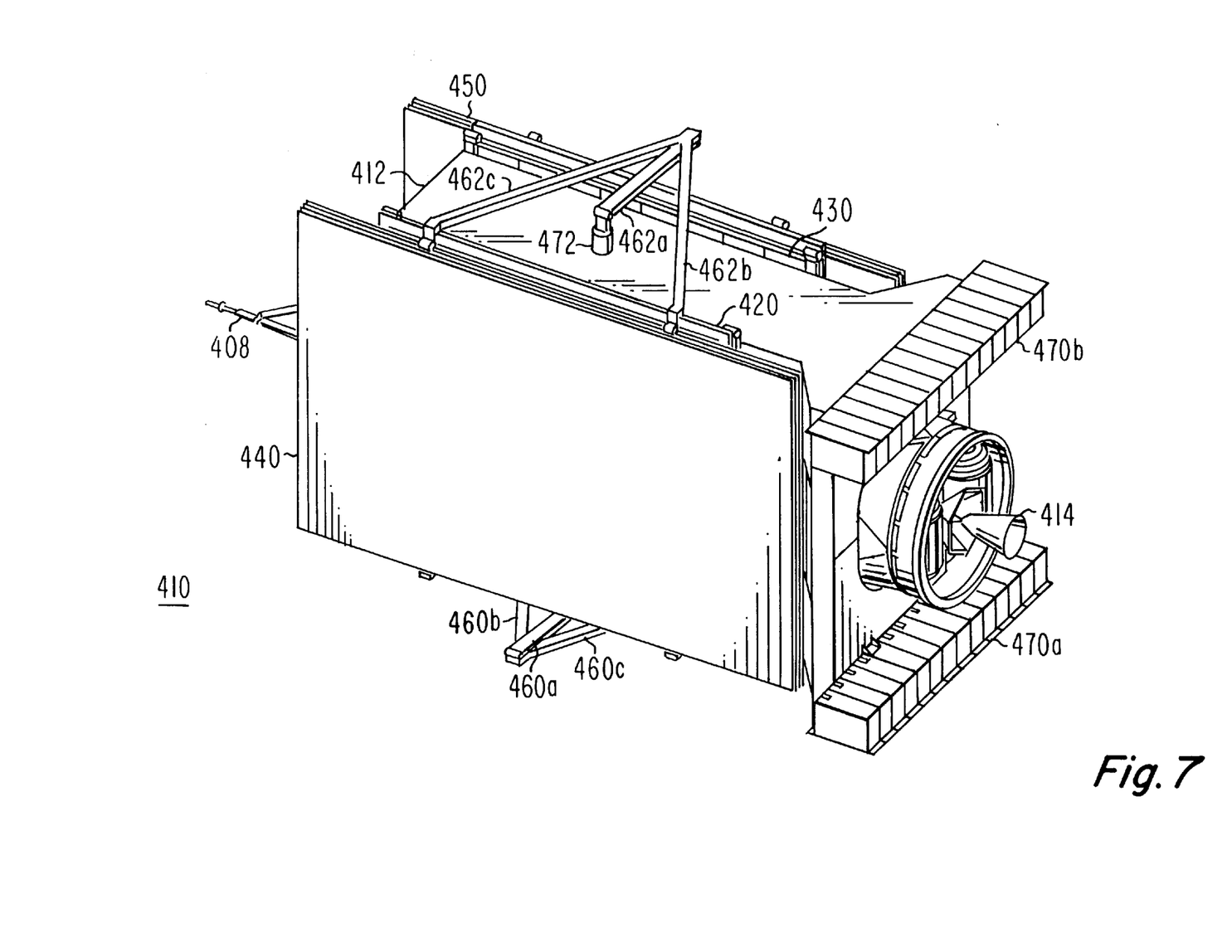
FIG. 7 illustrates the spacecraft of FIG. 4 with its arrays stowed.

FIG. 6 illustrates a condition of deployment preceding the condition of FIG. 5. In FIG. 6, the stacked antenna panels 420 and 430 are still folded against their respective sides of spacecraft body 412. Support elements 460a, 460b, and 460c and 462a, 462b, and 462c are beginning to deploy, so that the stacked solar panels 440, 450 swing away from the outer surfaces of the stacked antenna panels 420, 430. FIG. 7 illustrates the stowed.

It should be recognized that the stowed state of the spacecraft 410 of FIG. 7 precedes the partially deployed states of FIGS. 5 and 6, both of which precede the deployed state of FIG. 4. The spacecraft will ordinarily never proceed from a deployed state to the stowed state while on orbit.

Thus, a spacecraft (10) according to the invention comprises a supporting body (12), and a thruster (14) may be coupled to the body (12). The payload of the spacecraft (12) includes an active antenna array (20). The active antenna array (20) includes at least one active antenna array panel (22b). Active electronics elements, such as amplifiers, are inherently associated with an active array antenna (20), and generate waste heat when energized. The active antenna array panel(s) (20a) has (have) or defines an electromagnetic energy radiating first side (22ba) (an antenna side) and also defines a second side (22bh), which is principally for rejecting or radiating heat in order to maintain the operating temperature of the antenna panel (22b). The active antenna array panel(s) (22b) is (are) stowed with one of its first (antenna) sides (22ba) and second (heat-rejecting) sides (22bh) in proximity to the spacecraft body (12), where the term "proximity" admits of intervening panels (22a). The other one of the first (22ba) and second (22bh) sides of the active array panel(s) faces (face) away from the body (12). Thus, one of the heat-rejecting (22bh) or the antenna (22ba) sides of an active antenna array panel (22b) faces the body (12) of the spacecraft (10), possibly with intervening antenna panels. While the active antenna array (20) would not ordinarily be energized with the active array antenna panel (22b) in the stowed state, if it were to be so energized with the antenna side (22ba) facing the body (12), the electromagnetically reflective and/or attenuating portions of the body (12), and of any intervening panels (22a) would tend to prevent useful electromagnetic radiation, where the term "useful" implies the formation of a beam of the proper shape in the desired direction(s). Similarly, if the active antenna array panel(s) were energized with the panels in the stowed condition, with the heat-rejecting side (22bh) of the active antenna array panel (22b) facing the body (12), the body (12) would tend to absorb heat, increase in temperature, radiate back to the heat-rejecting side (22ah) of the antenna array panel, thus effectively reducing the net the heat rejection. In a deployed state, at least one of the antenna array panels (22a) is affixed to the body (12), as by a hinge or other support (24), and all of the antenna array panels are ultimately supported by the body, possibly by way of intervening antenna panels. The active antenna array panels are deployed with both the electromagnetic energy radiating first side (22ba) and the heat radiating second side (22bh) of the antenna panel(s) (22b) substantially free from radiation impediment by the body (12). Ordinarily, the first or antenna side (22ba) of the active antenna array panel(s) (22b) faces the Earth's surface for communication therewith, and the heat-rejecting side (22ah) faces empty space for tending to reject waste heat and thereby aid in maintaining the temperature of the array. The spacecraft (12) includes a solar array (40) with at least one solar panel (42a). The solar panel (42a) defines an active side (42aa) which is responsive to solar radiation for producing electrical energy, and the electrical energy is used for energizing at least the active antenna array (20) in its deployed state, and may be used for other purposes. The solar panel (42a), in a deployed state, is located relative to the active antenna array panel (22a) in such a manner as not to substantially impede the radiation of heat and electromagnetic energy therefrom. The solar panel (42a) is stowed contiguous with, or adjacent to, that one of the first (antenna) side (22ba) and second (heat-rejecting) side (22bh) of the active antenna array panel (22b) which is remote from, or most distant from, the spacecraft body (12). Thus, the solar panel (42a) is located "outside" the antenna panel(s) (22b) when in the stowed state (outside, relative to the body of the spacecraft). In the described stowed state of the solar panel(s) (42a) it (they) insulate(s) one side of the active antenna array panel (22b), so that the antenna array panel(s) (22b) is (are) sandwiched between the body (12) and the solar panel(s) (42a). When so sandwiched, heat cannot be radiated effectively by the active antenna array panel(s) (22b), so they cannot get too cold, and the active antenna array panels (22a) are protected from direct solar radiation, and their temperature therefore tends to remain moderate. In one embodiment of the invention, the active side (42aa) of at least one of the solar panels (42a), when in the stowed state, is remote from the antenna array panel(s) (22a), and is exposed to space. With the described stowed condition, the solar panel (42a) can produce electrical energy when exposed to solar radiation, as in an intermediate orbit.

In one embodiment of the invention, at least one propellant tank (16) is mounted on the body (12), and is coupled to the thruster (by a pipe 17) for controllably providing propellant thereto.

Other embodiments of the invention will be apparent to those skilled in the art. For example, the number of solar arrays carried by the spacecraft will depend on the power required by the spacecraft, and each solar array may have any number of solar panels. Similarly, any number of active antenna arrays may be carried by the spacecraft, depending upon its communication requirements, and they may be at numerous different frequencies, and directed in numerous different directions. While the active antenna array panels have been described as though each is an independent antenna, those skilled in the art know that a plurality of panels, or portions of each one of a plurality of panels, may be associated together to constitute an antenna. Each panel of the solar array may be associated with one or more solar reflectors for reflecting solar energy toward the panel, in a manner which tends to increase the electrical output capability of the solar panel.

What is claimed is:

1. A spacecraft, comprising:

a body;

a deployable active antenna array including at least one active antenna array panel defining an electromagnetic energy radiating first side and a heat radiating second side, said active antenna array panel, in a stowed state, being stowed with one of said first and second sides facing said body and the other one of said first and second sides more remote from, and facing away from said body, in such a manner that said body tends to prevent radiation to and from one of said first and second sides of said antenna panel, and in a deployed state, said active array panel being ultimately supported by said body in a location in which said electromagnetic energy radiating first side and said heat radiating second side of said antenna panel radiate substantially free from impediment of radiation by said body; and a deployable solar array including at least one solar panel defining an active side responsive to solar radiation for producing electrical energy, said solar array panel, in a deployed state, being located relative to said antenna array panel in such a manner as not to substantially impede said radiation of heat and electromagnetic energy therefrom, and in a stowed state, being stowed in proximity to that one of said first and second sides of said antenna array panel remote from said body, whereby said solar array panel tends to insulate said antenna array panel against temperature changes attributable to radiative gain or loss of heat.

2. A spacecraft according to claim 1, wherein said solar panel is stowed with said active side of said solar panel remote from said antenna array panel and exposed to space, whereby, before deployment, said solar panel can, when exposed to solar radiation, produce electrical energy.

3. A spacecraft according to claim 1, wherein, in said deployed state, said antenna array panel is physically interposed between said body of said spacecraft and said solar array panel, so that said solar array panel is not supported directly by said body of said spacecraft, but is instead supported by way of said antenna array panel.

4. A spacecraft according to claim 3, wherein said solar array panel is physically coupled to said antenna array panel by a rotatable joint, whereby said solar array panel can be rotated relative to said antenna array panel.

5. A spacecraft according to claim 1, further comprising:

a thruster coupled to said body; and at least one propellant tank mounted on said body, and coupled to said thruster for controllably providing propellant thereto.

6. A spacecraft, comprising:

a body;

an active antenna array comprising a plurality of active antenna array panels, each defining an electromagnetic signal radiating first broad side and a second broad side, said active antenna array panels, in a stowed state, being stacked together to form a stack with one of said first and second broad sides facing said body and with another of said broad sides facing away from said body, said stack of active antenna array panels being held against said body in said stowed state, said active antenna array panels, in a deployed state, each having said first broad side facing the Earth and said second broad side facing into space; and a solar array including a solar panel stack comprising at least one solar panel, each solar panel of said solar panel stack defining an active side responsive to solar radiation for producing electrical energy for energizing at least said antenna array, said solar array, in a deployed state, being located relative to said antenna array panels in such a manner as not to substantially impede radiation therefrom, and, in a stowed state, having a broad side of said solar panel stack adjacent to that broad side of said stack of antenna array panels which is most remote from said body, whereby, before deployment, said solar panel stack tends to insulate said antenna array panels against temperature changes attributable to radiative gain or loss of heat.

7. A spacecraft according to claim 6, wherein said solar array is stowed with said active side of the outermost solar panel of said solar panel stack remote from said antenna array panel and exposed to space, whereby said solar panel can produce electrical energy when exposed to solar radiation in the stowed state.

8. A spacecraft according to claim 7, wherein said solar array includes a plurality of solar array panels, and said outermost solar array panel, in said stowed state, is spaced away from said stack of antenna panels by at least one additional solar array panel.

9. A method for launching a spacecraft into an orbit, comprising the steps of:

providing a spacecraft including a body, at least one active array antenna panel, and a solar panel;

stowing said active array antenna panel against said body;

stowing said solar panel over said active array antenna panel, to thereby form a launchable spacecraft in which said active antenna array panel is sandwiched between, and thermally protected by, said body and said solar panel;

mounting said launchable spacecraft on a booster;

launching said launchable spacecraft into an intermediate orbit;

from said intermediate orbit, performing a velocity change maneuver to achieve another orbit;

in said other orbit, deploying said solar panel; and in said other orbit, deploying said active array antenna panel.

10. A method according to claim 9, wherein:

said step of stowing said solar panel includes the step of stowing said solar panel with an active side of said solar panel facing away from said active array antenna panel; and further comprising the steps of in said intermediate orbit, orienting said active side of said solar panel for receiving solar radiation to thereby generate electrical energy in said solar panel; and in said intermediate orbit, using said electrical energy to operate at least portions of said spacecraft.

11. A spacecraft, comprising:

a body;

a deployable active antenna array including at least one active antenna array panel defining an electromagnetic energy radiating first side and a heat radiating second side, said active antenna array panel, in a stowed state, being stowed with one of said first and second sides facing said body and the other one of said first and second sides more remote from, and facing away from said body, in such a manner that said body tends to prevent radiation to and from one of said first and second sides of said antenna panel, and in a deployed state, said active array panel being ultimately supported by said body in a location in which said electromagnetic energy radiating first side and said heat radiating second side of said antenna panel radiate substantially free from impediment of radiation by said body; and a deployable solar array including at least one solar panel defining an active side responsive to solar radiation for producing electrical energy, said solar array panel, in a deployed state, being located relative to said antenna array panel in such a manner as not to substantially impede said radiation of heat and electromagnetic energy therefrom, and in a stowed state, being stowed in proximity to that one of said first and second sides of said antenna array panel remote from said body, whereby said solar array panel tends to insulate said antenna array panel against temperature changes attributable to radiative gain or loss of heat.

* * * * *